(12) United States Patent
Thompson (10) Patent No.: US 8,144,995 B2
(45) Date of Patent: Mar. 27, 2012

(54) SYSTEM AND METHOD FOR SEARCHING DIGITAL IMAGES

(75) Inventor: Kelly Thompson, Calgary (CA)

(73) Assignee: Getty Images, Inc., Seattle, WA (US)

( * ) Notice: Subject to any disclaimer, the term of this patent is extended or adjusted under 35 U.S.C. 154(b) by 1481 days.

(21) Appl. No.: 11/543,726

(22) Filed: Oct. 4, 2006

(65) Prior Publication Data

US 2007/0109616 A1   May 17, 2007

Related U.S. Application Data

(60) Provisional application No. 60/722,980, filed on Oct. 4, 2005, provisional application No. 60/742,552, filed on Dec. 6, 2005.

(51) Int. Cl.
*G06K 9/68* (2006.01)
(52) U.S. Cl. ......... 382/218; 382/176; 382/190; 382/305
(58) Field of Classification Search ............... 348/218.1, 348/231.3, 231.5; 382/305, 306; 707/5, 707/104.1; 709/200, 219
See application file for complete search history.

(56) References Cited

U.S. PATENT DOCUMENTS

| | | | | |
|---|---|---|---|---|
| 5,901,245 A * | 5/1999 | Warnick et al. | | 382/190 |
| 5,913,205 A * | 6/1999 | Jain et al. | | 1/1 |
| 6,115,717 A * | 9/2000 | Mehrotra et al. | | 1/1 |
| 6,661,919 B2 * | 12/2003 | Nicholson et al. | | 382/173 |
| 6,711,291 B1 | 3/2004 | Stubler et al. | | |
| 7,051,019 B1 | 5/2006 | Land et al. | | |
| 7,068,309 B2 * | 6/2006 | Toyama et al. | | 348/231.5 |
| 7,454,061 B2 * | 11/2008 | Yanagisawa et al. | | 382/181 |
| 2003/0074391 A1 * | 4/2003 | Carter et al. | | 709/200 |
| 2004/0070678 A1 * | 4/2004 | Toyama et al. | | 348/231.3 |
| 2004/0218058 A1 * | 11/2004 | Yamaguchi et al. | | 348/218.1 |
| 2005/0190273 A1 * | 9/2005 | Toyama et al. | | 348/231.5 |
| 2005/0256867 A1 * | 11/2005 | Walther et al. | | 707/5 |
| 2006/0184574 A1 | 8/2006 | Wu et al. | | |
| 2006/0210170 A1 | 9/2006 | Yumoto et al. | | |
| 2008/0301128 A1 * | 12/2008 | Gandert et al. | | 707/5 |

OTHER PUBLICATIONS

"iStockphoto Makes it Easy for Designers to Match Copy to Images with New CopySpace Feature", *Layers Magazine*, Nov. 1, 2005. Available at <http://www.layersmagazine.com/> Last accessed Sep. 28, 2006. 1 page.
Goetze. "Stockbyte introduces New Search Filtration", StockPhotoTalk Special Interest Blog. Wednesday, May 19, 2004. Available at http://www.stockphototalk.com/phototalk/2004/05/stockbyte_intro.html, 1 page.
Smith, et al. "VisualSEEk: a fully automated content-based image query system", ACM Multimedia '96, Boston, Massachusettes. Copyright 1996, pp. 87-98.

* cited by examiner

*Primary Examiner* — Gregory M Desire
(74) *Attorney, Agent, or Firm* — Perkins Coie LLP (57) ABSTRACT

A method and system for automatically analyzing and searching a database of images or other digital content includes a process for analyzing images to identify portions capable of receiving text. In one implementation user input is received, where the user input helps construct a profile matrix representing image features desired by the user. The constructed profile matrix is compared to profile matrices of the database of images, and images are retrieved with profile matrices corresponding to the constructed profile matrix.

18 Claims, 11 Drawing Sheets

SYSTEM AND METHOD FOR SEARCHING DIGITAL IMAGES

CROSS-REFERENCE TO RELATED APPLICATION(S)

This application claims the benefit of U.S. Provisional Application No. 60/722,980, filed Oct. 4, 2005 and U.S. Provisional Application No. 60/742,552, filed Dec. 6, 2005.

BACKGROUND

In the sales, marketing and copywriting industries one of the desired features of an image is the availability of copy space. Copy space generally refers to a physical place on an image where copy or text may be added when the image is used in a design of an advertisement or display of the image in sales and marketing or related material.

With the proliferation of large libraries of internet sites making digital images available to these designers and copywriters, there is a need for a system and method to quickly search these libraries for images having copy space that satisfy their design requirements.

Current techniques for identifying images with copy space or specific features include tags, which are generally text descriptors, included as part of the image metadata. The tag data must be determined before the images are uploaded to the library. The user then searches the library for all such images having tags indicating available copy space.

A disadvantage of the tagging is that each image must be viewed and then appropriately tagged when uploaded to the library. This process can be time consuming and highly susceptible to human error. Furthermore current tags are limited in the amount of information they provide. Current searches will retrieve images that simply have copy space available, but not provide an indication as to how much space is available, where it occurs in the image, etc. So, users are not easily able to identify whether a selected group of images have, for example, a large enough copy space.

BRIEF DESCRIPTION OF THE DRAWINGS

Embodiments of the invention will now be described with reference to the accompanying Figures, wherein:

FIGS. 5a and b are further screen captures of the GUI according to an embodiment of the invention;

DETAILED DESCRIPTION

The following description sets forth a number of specific implementations to autonomously detect copy space in digital images and for searching digital images by copy space. While the description refers to copy space, this is one suitable application of the system and methods of the present invention. The present invention may be used for other areas or features of interest in a digital image, video, animation, or other digital content.

In the following description, like numerals refer to like elements throughout. The terminology used in the description presented herein is not intended to be interpreted in any limited or restrictive manner, simply because it is being utilized in conjunction with a detailed description of certain specific embodiments of the invention. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. Furthermore, embodiments of the invention may include several novel features, no single one of which is solely responsible for its desirable attributes or which is essential to practicing aspects of the inventions herein described.

An aspect of the invention provides for a method for selecting images having desired features from multiple digital images, comprising the steps of:

a. processing each image to identify multiple contiguous areas of predetermined pixel variations, representing the desired features;

b. assigning a numerical value to each such identified area to produce a set of ordered values for each the image;

c. storing the set of ordered values for each the image;

d. receiving a user specified set of ordered values corresponding to features desired by the user;

e. comparing the user specified set of ordered values to the stored values; and f. retrieving images having a set of ordered values matching the set of user specified ordered values.

Another aspect of the invention provides for a computer-implemented system for selecting digital images having desired features in multiple images, comprising:

a. a network interface configured to exchange digital messages with an image service supplier computer over a network;

b. a browser configured to display web pages served by the image service supplier computer;

c. an input mechanism configured for a user to enter as a set of ordered values and select items presented on the web pages; and d. a processor configured to execute computer readable instructions that
   i. process the multiple images to identify in each image contiguous areas of predetermined pixel variations, representing desired features;
   ii. assign a numerical value to each such identified area to produce a set of ordered values for each the image;
   iii. store the set of ordered values for each the image;

iv. receive the user-specified set of ordered values corresponding to features desired by the user;

v. compare the user specified set of ordered values to the stored values;

vi. retrieve images having a set of ordered values matching the set of user specified ordered values; and vii. make the retrieved images available to the image services computer.

Figure 1:
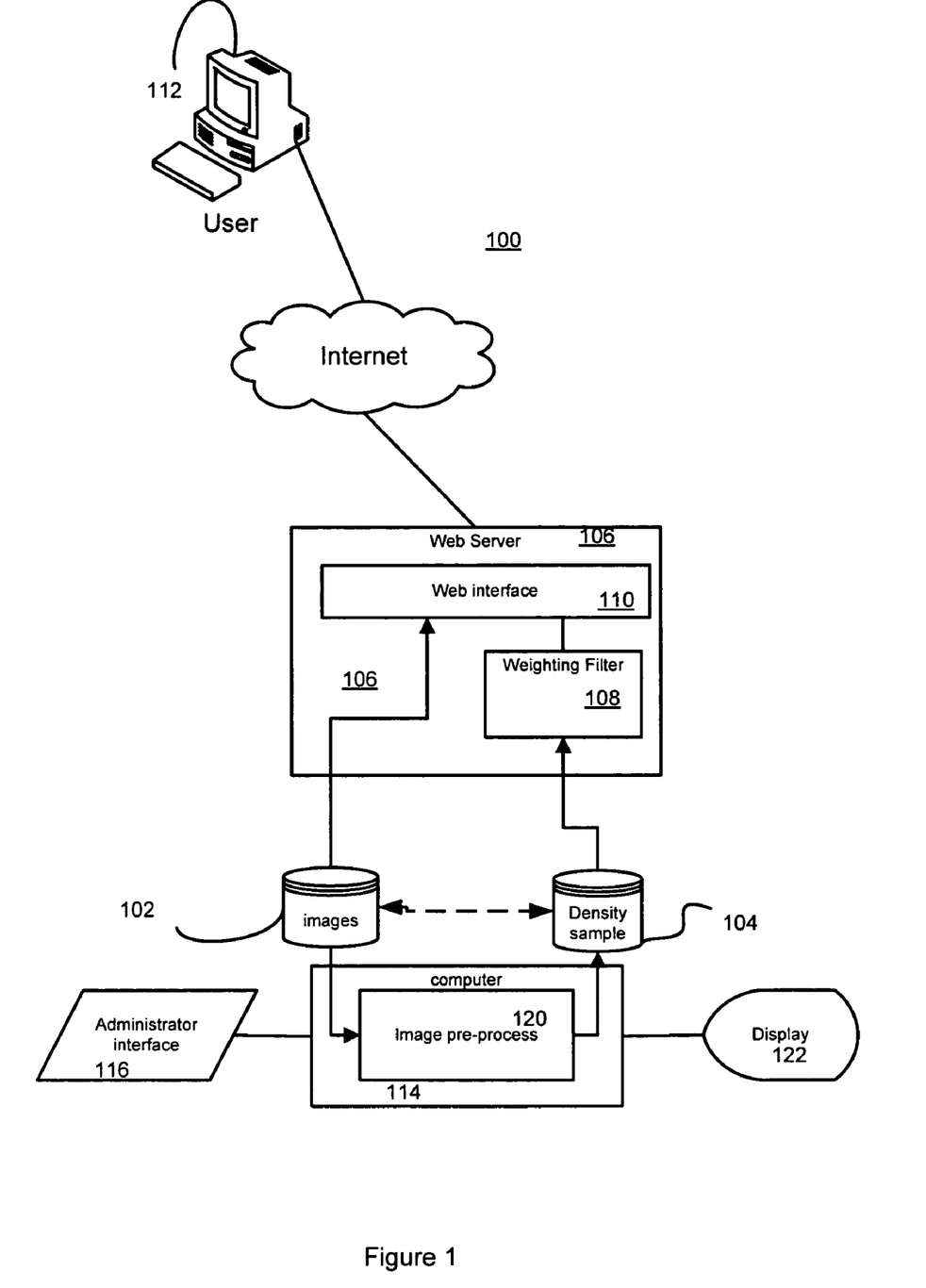
FIG. 1 is a block diagram of a system according to an embodiment of the present invention.

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Referring to FIG. 1, an image processing system 100 for detecting features, such as copy space in digital images includes an image database 102 for storing stock digital images; a density sample database 104 for storing density samples corresponding to respective images in the image database 102; and a web server 106 comprising a weighting filter module 108 coupled to communicate with the density sample database 104 and a web interface 110. The web interface allows a Web enabled user 112 to view images retrieved from the images database 102 and to select and retrieve a list of images matching the users 112 requirements as specified through the weighting filter module 108. A computer 114 includes an administrator input interface 116 and a display 118 for running an image-pre-processing module 120 coupled to process the images from the images database 102 to produce corresponding density samples stored in the density sample database 104. The density sample may also be termed an image profile matrix.

The computer has one or more processors and one or more forms of computer-readable memory media such as electronic memory, magnetic storage media, optical storage media, or some other type of data storage. Programs and modules are stored in the memory from where they are executed by the processor. In this example, such programs include the image pre-processing module 110, and well as an operating system, file I/O module for reading and writing to the databases and memory. The system is preferably accessible to a user and/or administrator via a network such as the Internet via suitable Web interface or it may also be a stand-alone system.

Figure 2:
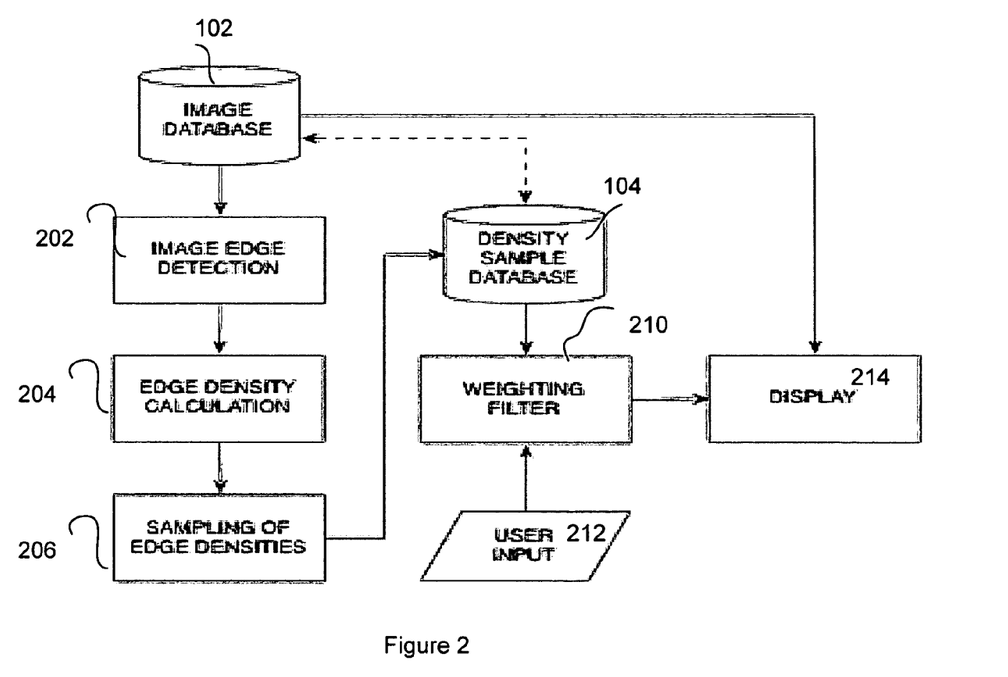
FIG. 2 is a process diagram according to an embodiment of the present invention.

Referring now to FIG. 2, logical processing blocks for using the image processing system 100 include an image edge detection block 202 for applying an edge detection algorithm to an image selected from the image database 102 to produce an edge detected image showing edges of features in the selected image, an edge density calculation block 204 for computing a value indicative of the density of edges in predetermined areas of the edge detected image and a sampling of edge densities block 206 for compiling the values produced by the edge densities module 206 and saving them to the density sample database 104. The logical processing blocks 200 also include a weighting filter block 210 for retrieving a list of images from the density sample database 104 which match a user filter specified by a user via a user input block 212 and a display block 214 for displaying the images from the image database 102 which were determined as matching the user filter.

Referring now to FIGS. 1 and 2, a method of operation will be described according to an embodiment of the invention. Before a user can search images, the original images must be pre-processed to produce corresponding density sample images in a manner discussed as follows. In a pre-processing step, images from the image database 102 are loaded and pre-processed by the image pre-process module 120, which includes the image edge detection block 202, the edge density calculation block 204 and the sampling of edge densities block 206. Each loaded image (colour, greyscale or black and white) undergoes edge detection, which produces a modified monochrome 8-bit greyscale raster image showing edges— the more pronounced the edge, the lighter the color. Next an edge density calculation is performed on the modified 8-bit greyscale raster image, which is of an N×N resolution obtained by resampling the modified image to a grid of N×N pixels. Next the image is notionally divided into nine (3 by 3) sample sections (or other regular K by K grid) and the average edge density in each sample section is computed, these values are saved to the density sample database 104. The values for each sample section range from 0 to 255 that correspond to an average of the down-sampled pixel value for that area (the value for pixels range from 0 to 255, with the value 0 indicating that the pixel is completely black and the value 255 indicating that the pixel is white). It is well known that the lighter a digital image the higher the edge density in each sample section.

When a user (not shown) decides to search the system for images that satisfy the user's desired features, the user's input is collected to determine where in the grid of N×N pixels she wishes to locate lower levels or higher levels of edge density. The weighting filter block incorporating a weighting filter algorithm retrieves a list of images matching the user requirements, ordered by the most ideal choices (lowest of the lower levels or highest of the higher levels of edge density) and returns the list to the display which displays images from highest match to lowest match. The various steps will be described in more detail below.

Image Pre-Processing

Figure 7:
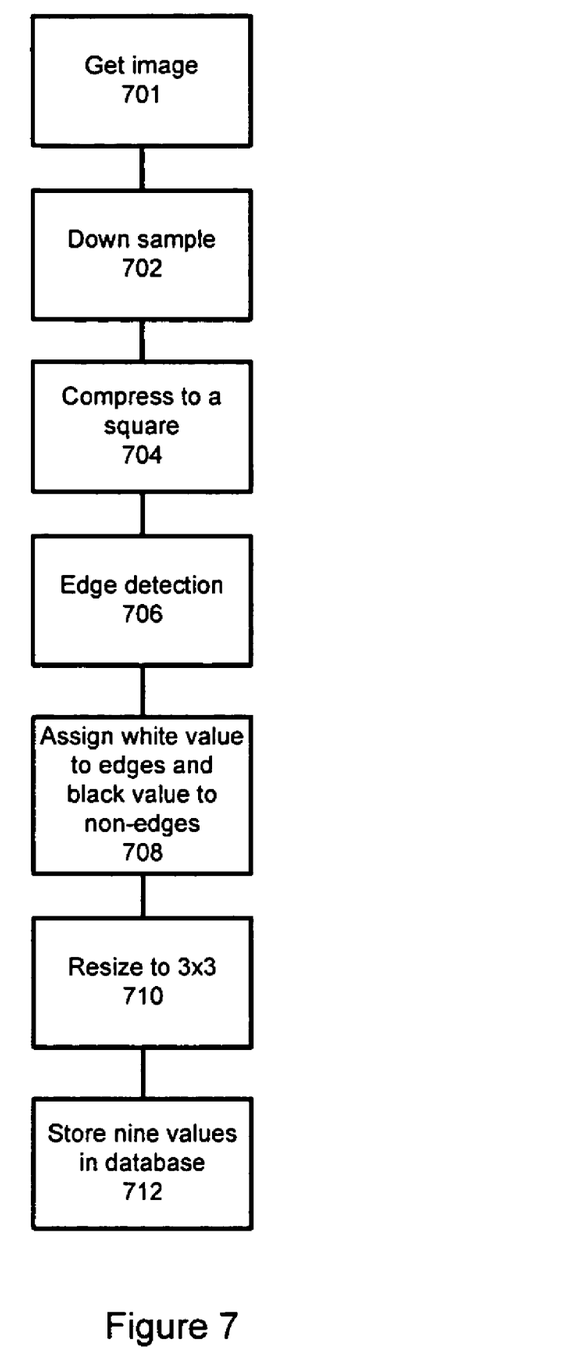
FIG. 7 is a flow chart showing the steps in processing an image according to an embodiment of the invention.
Figure 8A:
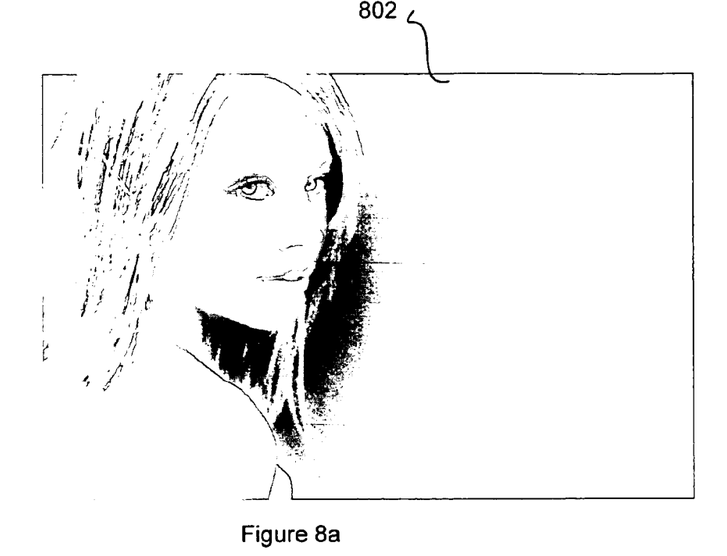
FIGS. 8a to 8f show a sequence of images resulting from the steps in the process of FIG. 7.
Figure 8B:
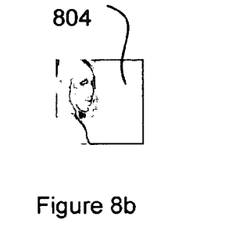
Figure 8C:
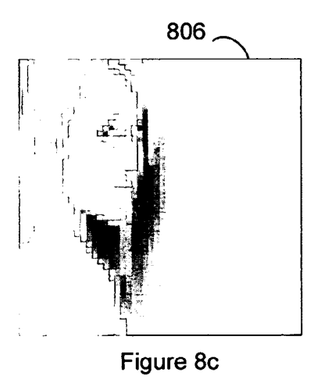
Figure 8D:
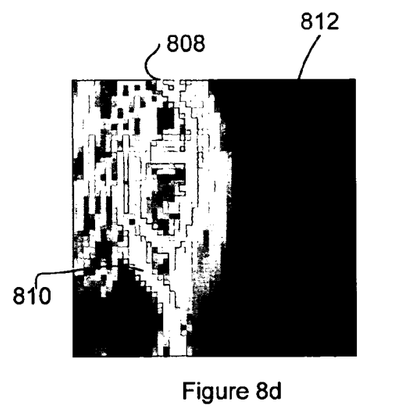
Figure 8E:
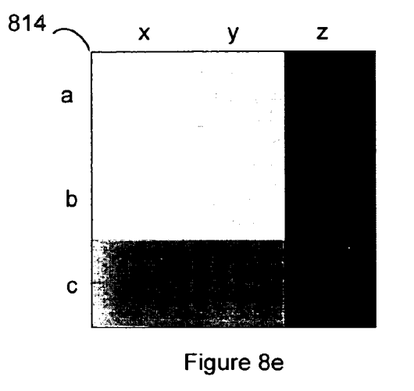
Figure 8F:
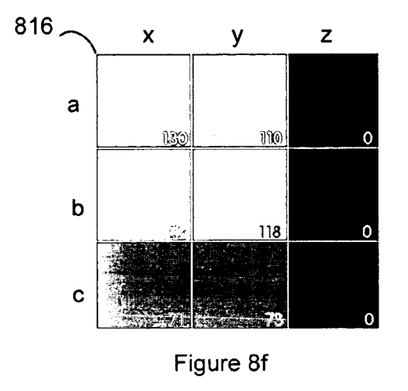

Referring now to FIG. 7 along with the sequence of FIGS. 8a to 8f, an exemplary procedure for constructing an image profile matrix is shown. In this embodiment, the image profile matrix is constructed by processing the images to find contiguous areas of relatively flat, item-less spaces appropriate for adding copy. An image 802 is selected from the image database 102 (or other source). At step 702 the image is down-sampled 804 to reduce subsequent processing overhead, by using any well-known (bicubic-resampling for example) algorithm. At step 704 the image is resized 806 with unconstrained proportions to fit a square, thereby compensating for different aspect ratios in the original image 802. Empirical testing showed down sampling to a 50×50 pixel square 806 provided a good compromise between computational performance and a sufficient level of required detail, although other sampling values may be used as well. At step 706 the down sampled square image 806 is processed to determine the edges within the image using a suitable edge detection algorithm (a suitable algorithm is described in J. Canny, A Computational Approach to Edge Detection, ICCC Transactions on Pattern Analysis and Machine Intelligence, Vol. 8, No. 6, November 1896, and incorporated herein by reference). The algorithm is used to assign values at step 708 to the detected edges within the image 808 as white 810 and non-edges as black 812, to produce a black and white image. This black and white image 808 is further resized (here again a bicubic resampling algorithm may be used) to a 3×3 pixel matrix 814 to produce nine sample sections at step 710. The resulting image produces a greyscale value in each sample section. Resizing the image produces 1 pixel in each sample section each within a pixel value range of 0 (black) to 255 (white). The 3×3 matrix was chosen because it seems to represent a good trade-off between computation and usability. It represents generally how a graphic designer characterises an image when looking for copy space within an image. Other matrix dimensions may also be used (N×M), depending on the application. The integer greyscale values (0-255) in each section 816 are stored at step 712 in the database as a set of ordered density sample values for the given image 802. The higher the integer value (closer to white) in a section, the less 'flat' the image is, and the less suitable it is for text to be placed over it.

The sample's densities may be stored as a record in the database alongside the original image or indexed to a separate database. Thus it may be seen that one aspect of the present invention is the construction of an image profile matrix (or image processing) associated with the image. While the above describes a specific method for constructing an image profile matrix (a searchable ordered list defining features with respect to their special location on an image), other methods may also be used. Such as for example manual methods may also be used to construct the profile matrix, although this is less than desirable, particularly if larger matrices are to be used.

Searching Images for Copy Space

Figure 4A:
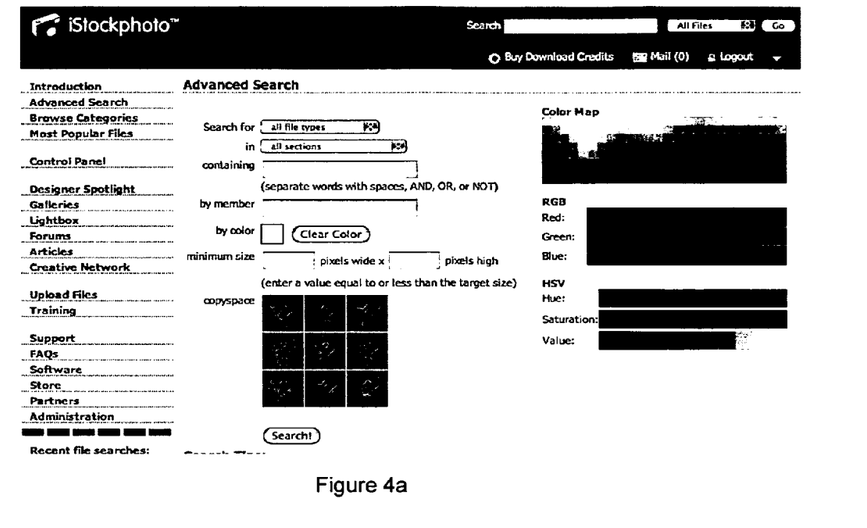
FIGS. 4a, b and c are screen captures of a GUI according to an embodiment of the invention.

Referring to FIG. 4a, an example of a Web-based graphical user interface (GUI) provided via the Web interface 110 allows users to search the image database for images that satisfy the user's copy space requirements and wherein the images to be searched have associated therewith a respective image profile matrix. The screens or web pages described herein provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 3:
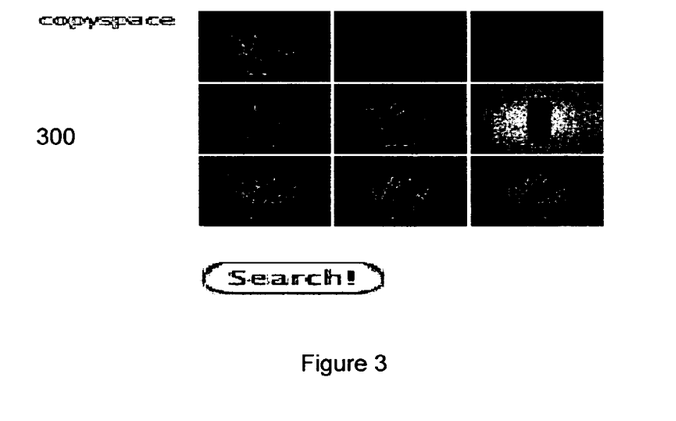
FIG. 3 is a graphical representation of a search parameter input screen.

Referring to FIG. 3, there is shown a GUI 300 for performing a feature search according to an embodiment of the present invention and wherein the images are associated with a three by three profile matrix. As described above, the grid notionally represents an image that has been divided into nine sections, each corresponding to a potential copy space area on an image. The user is allowed to select elements of the grid corresponding to areas on an image where there is:

a. Copy space desired (represented by a "T" image);
    b. No copy space (represented by a mountain image); or
    c. Either copy space or an image present (a "don't care" space, represented by a "?" image)

In one embodiment, the grid initially displays a question mark or other suitable symbol or colour in each of the grid element positions. The user, by use of a suitable input device (such as a mouse) selects one or more of the nine elements to specify one of the three options above. The options thus selected are converted to a range of pixel values, which are predetermined by the weighting filter 108. In the depicted embodiment the predetermined ranges of pixel values are chosen to be the integer values: 0-40 (representing empty space i.e. space for text), 80-255 (image i.e. no space for text). These values have been determined by empirical testing, although other values may be used. Thus each grid produces a set of nine ordered pixel-values dependant on the user's selection. These values are searched against the ordered sets of sample values stored in the sample density database earlier. As will be appreciated, other ranges could be used depending on the specific application, such as if a different matrix size was used.

In another embodiment different colours could represent different search options. For example, by the user clicking on an area of the 3×3 grid turns it green. This means that the user wants that area of the image to be open for copy. Clicking the area again turns it red. This means that the user wants that area occupied, or containing part of an image. A third click turns the area grey, meaning that the user has no preference for that area (squares of the matrix are grey by default).

The GUI could present as an option, a slider control (not shown) to allow the user to adjust tolerance levels or ranges for each element in the grid. Alternatively, the user could manually enter the values for each of the grid elements and these values entered by the user can be searched for by using classic methods against the set of values stored in the sample density database.

Figure 4B:
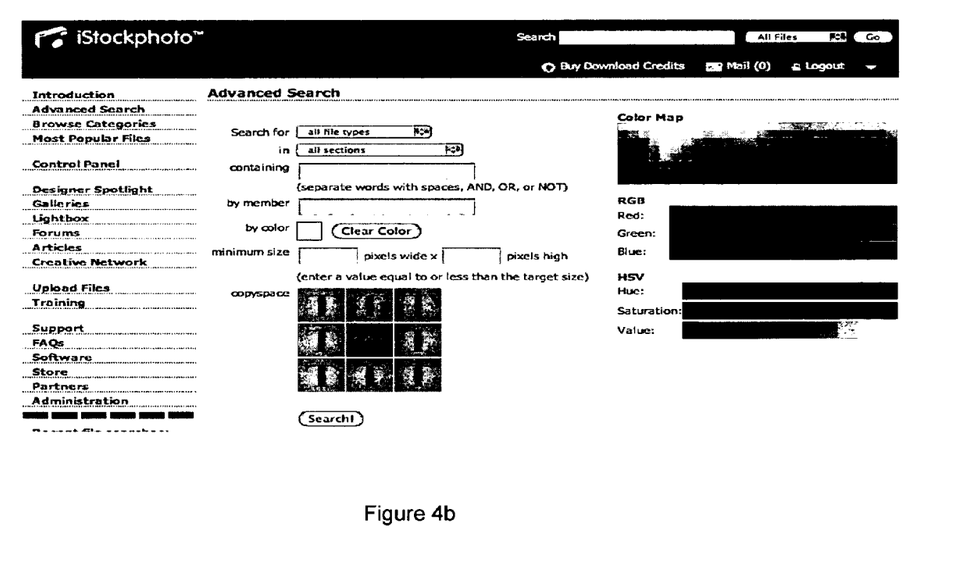

A feature search can be combined with other searching methods, such as Boolean keywords with tagged images to further filter results and sort by user-specified relevance, as for example shown in FIGS. 4a and 4b. Referring now to FIG. 4a, there is shown a screen capture of a user-selected search page.

Figure 4C:
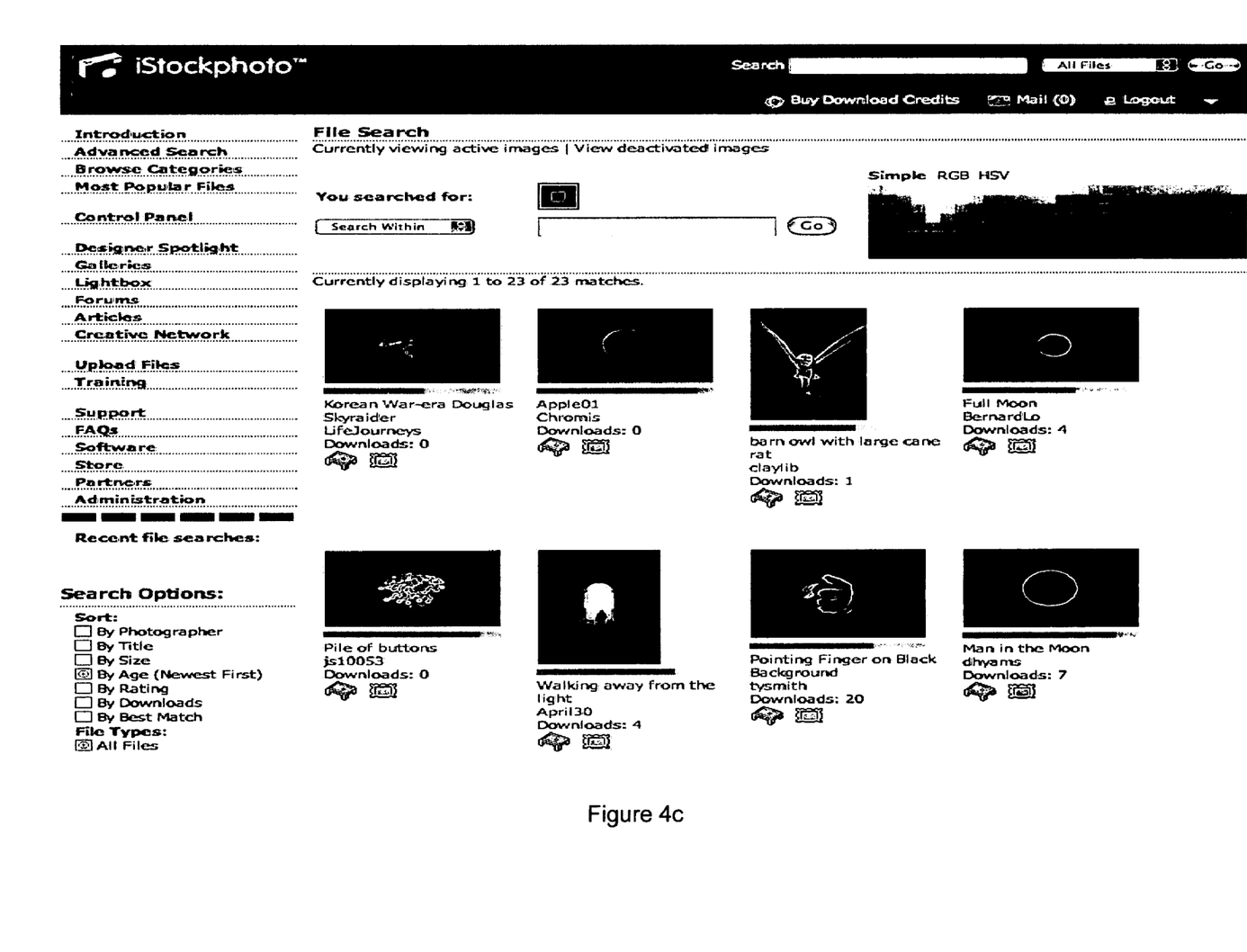

In FIG. 4b, there is shown a screen capture of a basic search, where the user selects only copy space options. In this instance, the user is looking for an object in the middle of the image, with copy space around all sides of the object. FIG. 4c shows a screen capture of the search results with retrieved images satisfying the search parameters.

FIG. 5a shows a screen capture of a search page where a user conducts a search with keywords (girl AND portrait) combined with a copy space option (object on the right, space on the left, either in the middle). FIG. 5b shows the results of this search. Another example of a search assumes that the user wants an image of a woman's face in the top left corner, with room for copy along the right hand side. The user would enter "woman" and "face" in the keywords field of the search page. Then the user would click the top left hand corner of the grid twice to turn it red and click all three of the right hand boxes once and turn them green. The user would then click the Search command button.

Figure 6A:
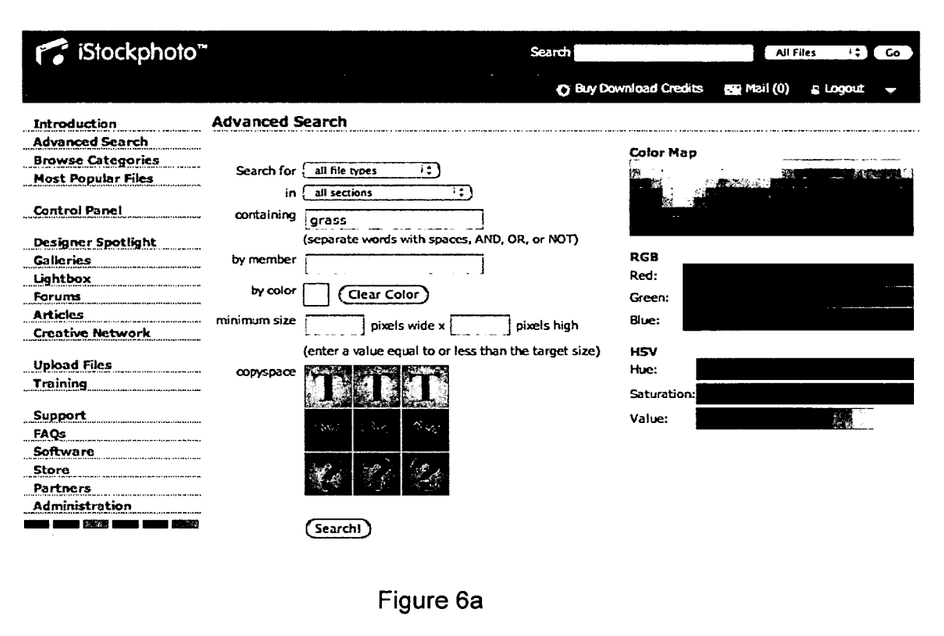
FIGS. 6a and b are still further screen captures of the GUI according to an embodiment of the invention.
Figure 6B:
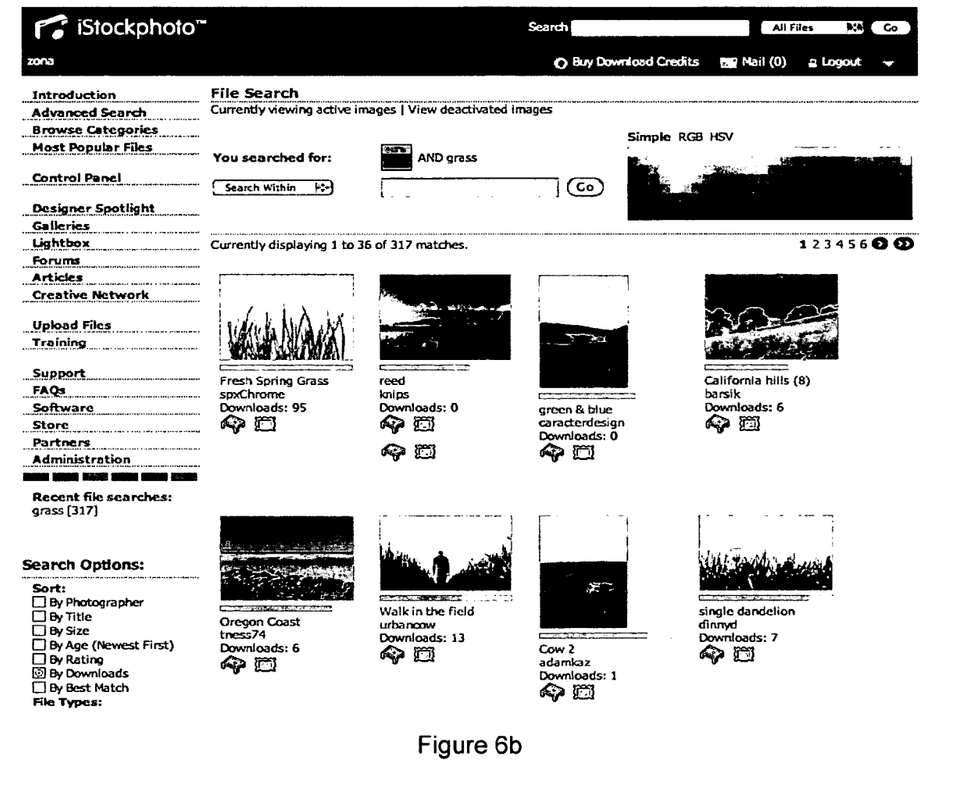

FIG. 6a shows a search page with a search using keywords (grass) combined with the copy space options (object in the middle, space on the top, anything along the bottom). FIG. 6b shows the results of this search.

While one example of a user interface is shown in the Figures, alternative or additional features may be provided. For example, the user interface may provide an option to allow the user to view an image having desirable copy space characteristics, and then, through an appropriate user interface element, initiate a search for similar stored images. For example a "more like this" or "find similar" button could initiate a search that identifies images in the database based on a location of copy space portions within the currently viewed or selected image.

Figure 9A:
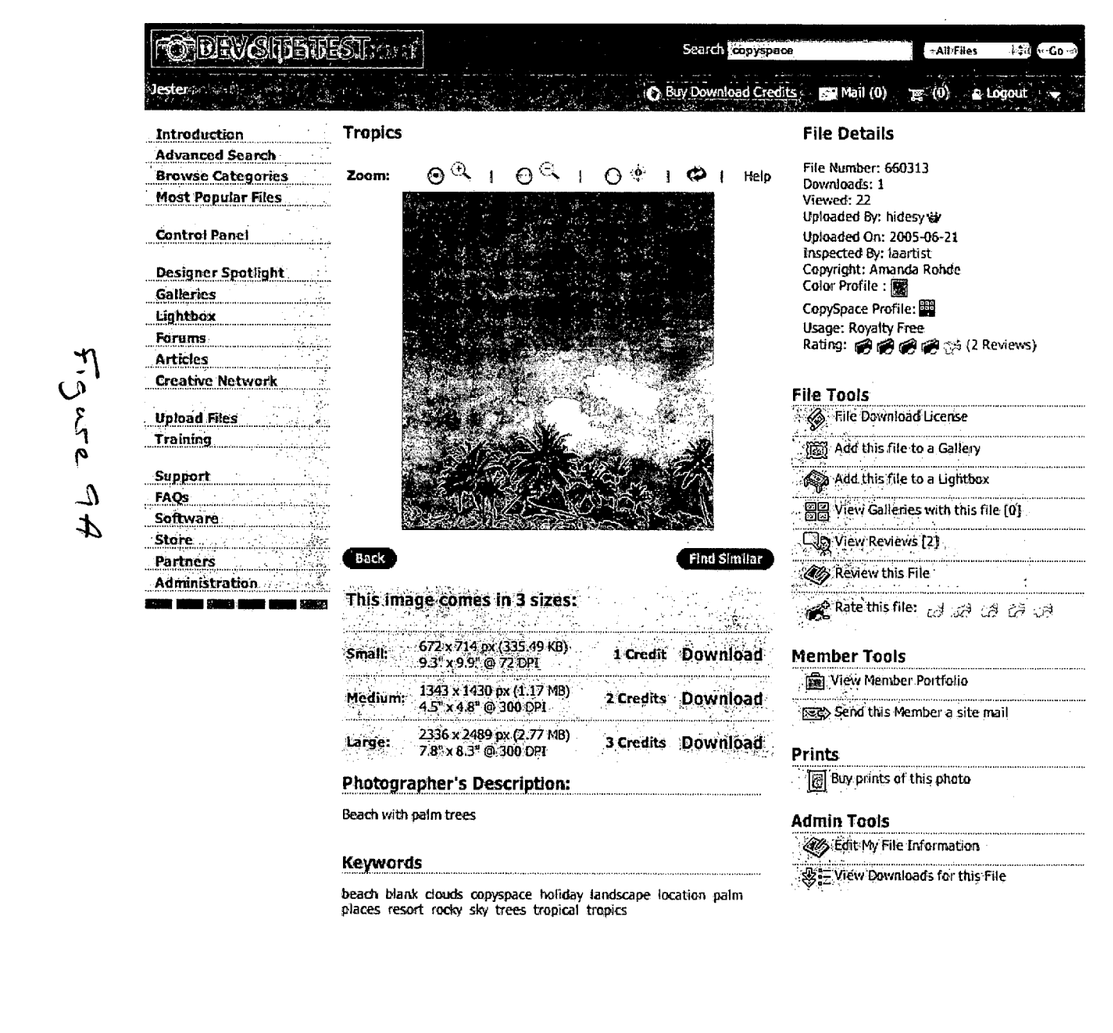
FIGS. 9a and 9b are screen captures of the GUI according to yet another embodiment of the invention.
Figure 9B:
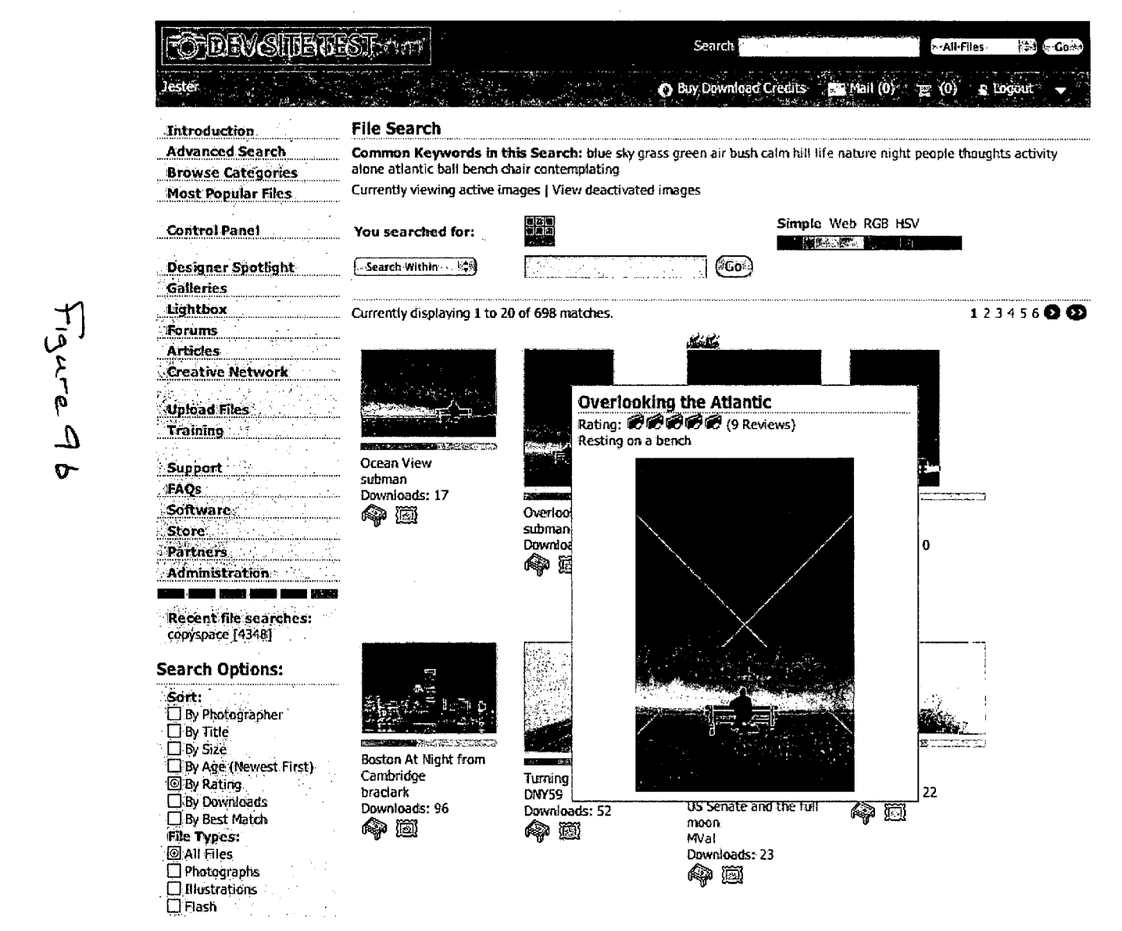

For example, referring to FIG. 9a there is shown a search results page 900, wherein the detail of an image 902 is displayed along with a profile matrix 904 of that image. By clicking on the displayed profile matrix 904 for that image or a "find similar" command button 906 the system performs a search for images in the database having a similar profile matrix and displays these images 906, as illustrated in FIG. 9b. The image may not only be one from the database itself, but also one imported by the user into the system.

In an alternative embodiment, images may not only store the metadata noted above with respect to density and other data automatically obtained from analyzing the image, but also common metadata tags that indicate existence of copy space within an image, and so forth. Thus, users could employ standard metadata search techniques to find desired images.

Further, the user may select a desired color to be used in the search, as shown in, for example, FIG. 6a with the "by color" box and the right hand column color map portion. A user may select one of the displayed colors, and modify that color based on red, green, blue, hue, saturation and/or value modifiers. Thus, the search can include a search for images having copy space with a desired color.

While the embodiments described above apply to still digital images, aspects of the invention may be applied to other digital content, such as video, animations, etc. With video or animation, the search interface may include a desired time during which the copy space is displayed (e.g., a user may wish to have at least two seconds of copy space in a desired portion of a video/animation).

Conclusion

The foregoing description details certain embodiments of the invention. It will be appreciated, however, that no matter how detailed the foregoing appears in text, the invention can be practiced in many ways. For example the user search pages are described in the context of a Web base environment, with the search/results pages being accessed via a Web browser. The methods and processes could equally well be executed as a standalone system Furthermore, although the user desired features are described in the context of copy space requirements, other features in an image could also be searched, where a predetermined pixel variation can be identified. Although the subject matter has been described in language specific to structural features and/or methodological steps, it is to be understood that the subject matter defined in the appended claims is not necessarily limited to the specific features or steps described. Rather, the specific features and steps are disclosed as preferred forms of implementing the claimed subject matter.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments. Any patents and applications and other references noted above, including any that may be listed in accompanying filing papers, are incorporated herein by reference.

Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A tangible computer-readable medium storing instructions for defining a display description for providing a user interface to search digital content stored within a database, comprising:

a first display description portion defining first user interface components configured to receive user input to identify search criteria for digital content stored within the database based on text-based metadata, wherein at least some of the digital content stored in the database includes metadata searchable based on user input to the first user interface components; and further wherein the digital content consists of one or more still or moving digital images; and a second display description portion defining second user interface components configured to permit a user to specify search criteria for digital content having portions within the digital content capable of receiving text, wherein at least some of the digital content stored in the database is analyzed to determine portions capable of receiving text without obscuring or distorting the text; and further wherein the digital content consists of one or more still or moving digital images.

2. The tangible computer-readable medium of claim 1, wherein the second user interface portion is a 3 by 3 grid that permit a user to select one or more portions of the 3 by 3 grid in which text may or may not be placed.

3. A computer-implemented method of providing a user interface for allowing a user to selectively search digital content stored in a database, the method comprising:

displaying a first display portion of a user interface, wherein the first portion is configured to receive a first user input specifying a first search criteria based on text-based metadata to identify respective ones of the digital content stored within the database that are tagged with the text-based metadata; and further wherein the digital content consists of one or more still or moving digital images; and displaying a second display portion of the user interface, wherein the second portion is configured to receive a second user input specifying a second search criteria to identify the respective digital content tagged with the text-based metadata having one or more portions thereof capable of receiving text or other displayable information without obscuring or distorting the text or other displayable information; and further wherein the digital content consists of one or more still or moving digital images.

4. The method of claim 3 wherein the second display portion displays multiple elements in a grid to represent the one or more portions of the digital content, wherein the second display portion initially displays the multiple elements in the grid as representations of the one or more portions of the digital content that include one of text space and image content, and wherein the at least some of the multiple elements in the grid represent a "don't care" symbol for portions that may receive either text or image content.

5. The method of claim 3 wherein the second display portion displays multiple elements in a grid to represent the one or more portions of the digital content, and wherein the second display portion initially displays the multiple elements in the grid as representations of the one or more portions of the digital content that include one of text space and image content.

6. The method of claim 3 wherein the second display portion displays multiple elements in a grid to represent the one or more portions of the digital content.

7. The method of claim 3 wherein the second display portion displays multiple elements in a grid to represent the one or more portions of the digital content, wherein the second search criteria includes specified ones of the plurality of elements in the grid selected by a user to represent the one or more portions of the digital content capable of receiving text or other displayable information.

8. The method of claim 3 wherein the second display portion displays multiple elements in a grid to represent the one or more portions of the digital content, and wherein the second search criteria includes specified ones of the multiple elements in the grid selected by the user to represent the one or more portions of the digital content that include image content.

9. The method of claim 3 wherein the second display portion displays multiple elements in a grid to represent the one or more portions of the digital content, and wherein the multiple elements in the grid form a 3×3 grid format.

10. The method of claim 3 wherein the second display portion displays multiple elements in a grid to represent the one or more portions of the digital content, wherein the second search criteria includes specified ones of the multiple elements in the grid selected by a user to represent the one or more portions of the digital content capable of receiving either text or other displayable information.

11. A tangible computer-readable medium carrying instructions, which when executed by a computer, perform a method of providing a user interface for allowing a user to selectively search digital content stored in a database, the method comprising:

displaying a first display portion of a user interface, wherein the first portion is configured to receive a first user input specifying a first search criteria based on text-based metadata to identify respective ones of the digital content stored within the database that are tagged with the text-based metadata; and further wherein the digital content consists of one or more still or moving digital images; and displaying a second display portion of the user interface, wherein the second portion is configured to receive a second user input specifying a second search criteria to identify the respective digital content tagged with the text-based metadata having one or more portions thereof capable of receiving text or other displayable information without obscuring or distorting the text or other displayable information; and further wherein the digital content consists of one or more still or moving digital images.

12. The tangible computer-readable medium of claim 11 wherein the second display portion displays multiple elements in a grid to represent the one or more portions of the digital content, wherein the second display portion initially displays the multiple elements in the grid as representations of the one or more portions of the digital content that include one of text space and image content, and wherein the at least some of the multiple elements in the grid represent a "don't care" symbol for portions that may receive either text or image content.

13. The tangible computer-readable medium of claim 11 wherein the second display portion displays multiple elements in a grid to represent the one or more portions of the digital content, and wherein the second display portion initially displays the multiple elements in the grid as representations of the one or more portions of the digital content that include one of text space and image content.

14. The tangible computer-readable medium of claim 11 wherein the second display portion displays multiple elements in a grid to represent the one or more portions of the digital content.

15. The tangible computer-readable medium of claim 11 wherein the second display portion displays multiple elements in a grid to represent the one or more portions of the digital content, wherein the second search criteria includes specified ones of the plurality of elements in the grid selected by a user to represent the one or more portions of the digital content capable of receiving text or other displayable information.

16. The tangible computer-readable medium of claim 11 wherein the second display portion displays multiple elements in a grid to represent the one or more portions of the digital content, and wherein the second search criteria includes specified ones of the multiple elements in the grid selected by the user to represent the one or more portions of the digital content that include image content.

17. The tangible computer-readable medium of claim 11 wherein the second display portion displays multiple elements in a grid to represent the one or more portions of the digital content, and wherein the multiple elements in the grid form a 3×3 grid format.

18. The tangible computer-readable medium of claim 11 wherein the second display portion displays multiple elements in a grid to represent the one or more portions of the digital content, wherein the second search criteria includes specified ones of the multiple elements in the grid selected by a user to represent the one or more portions of the digital content capable of receiving either text or other displayable information.

\* \* \* \* \*

UNITED STATES PATENT AND TRADEMARK OFFICE
CERTIFICATE OF CORRECTION

PATENT NO. : 8,144,995 B2  
APPLICATION NO. : 11/543726  
DATED : March 27, 2012  
INVENTOR(S) : Kelly Thompson Page 1 of 1

It is certified that error appears in the above-identified patent and that said Letters Patent is hereby corrected as shown below:

On the Title Page:

Item (56), in column 2, under "Other Publications", line 10, delete "Massachusettes." and insert -- Massachusetts. --, therefor.

In the Specifications:

In column 3, line 40, before "computer-readable" insert -- tangible --.

In column 4, line 4, before "computer-readable" insert -- tangible --.

In column 9, line 29, before "computer-readable" insert -- tangible --.

In column 9, line 30, before "computer-readable" insert -- tangible --.

Signed and Sealed this
Seventeenth Day of July, 2012

David J. Kappos
*Director of the United States Patent and Trademark Office*